US006763020B1

(12) United States Patent
Hon

(10) Patent No.: US 6,763,020 B1
(45) Date of Patent: Jul. 13, 2004

(54) CALL ESTABLISHMENT METHOD FOR DIAL-UP INTERNET TELEPHONY APPLIANCES

(75) Inventor: Foo Chen Hon, Singapore (SG)

(73) Assignee: InnoMedia, Inc., Milpitas, CA (US)

( * ) Notice: Subject to any disclaimer, the term of this patent is extended or adjusted under 35 U.S.C. 154(b) by 0 days.

(21) Appl. No.: 09/103,790

(22) Filed: Jun. 24, 1998

(51) Int. Cl.[7] .............................................. H04L 12/66
(52) U.S. Cl. ...................................... 370/356; 370/352
(58) Field of Search ................................ 370/352–357, 370/401, 466, 442–448, 260, 406, 330, 230, 458, 503; 455/401–403; 379/418, 88.7–88.24, 93.26, 120, 216, 202; 707/10, 104.1; 329/227.01, 207.01, 202.01; 705/35–42; 320/353, 458, 498, 401, 495

(56) References Cited

U.S. PATENT DOCUMENTS 5,892,764 A * 4/1999 Riemann et al. ............ 370/401
6,061,347 A * 5/2000 Hollatz et al. .............. 370/352
6,122,364 A * 9/2000 Petrunka et al. ............ 370/353
6,259,905 B1 * 7/2001 Berkowitz et al. .......... 455/401
6,266,340 B1 * 7/2001 Pickett et al. ............... 370/442
6,345,047 B1 * 2/2002 Regnier ...................... 370/352
6,366,578 B1 * 4/2002 Johnson ...................... 370/353

OTHER PUBLICATIONS

Brochure entitled "InfoTalk: Your Long–Distance Connection at Local Rates," copyright 1997 Innomedia (otherwise undated), 1 page (2–sided).

* cited by examiner

Primary Examiner—Chi Pham
Assistant Examiner—Prenell Jones
(74) Attorney, Agent, or Firm—Bingham McCutchen LLP; Fabio E. Marino

(57) ABSTRACT

A call establishment method for Internet Telephony appliances consisting of two phases. The first phase is a method of notifying the Internet Telephony appliance of the called party that a VoIP call is being attempted. The second phase is for both systems to automatically log on to the Internet and to proceed through the procedure to establish the VoIP call.

26 Claims, 5 Drawing Sheets

CALL ESTABLISHMENT METHOD FOR DIAL-UP INTERNET TELEPHONY APPLIANCES

TECHNICAL FIELD OF THE INVENTION

This invention relates generally to a method for facilitating Internet Telephony, and more specifically, to the method of connecting Internet Telephony calls.

BACKGROUND OF THE INVENTION

Internet Telephony makes use of the global connection of the Internet as an alternative voice carrier to enable that voice communications be carried out between different locations around the world. Voice is transmitted as IP packets over the Internet, hence the common term Voice-over-IP (VoIP) used to describe Internet Telephony. One major goal of Internet Telephony is to establish calls in a manner that is as simple as using normal telephone over the Public Switched Telephone Network (PSTN).

One important property of the PSTN network is that all PSTN devices, e.g., telephone sets, connect directly to the PSTN network at all times. When a caller needs to establish a call to another party, the caller needs only dial the telephone number of the party to call. The called party is alerted by the ringing of the telephone upon a successful connection. Both parties start to communicate when the called party picks up the telephone.

In contrast, dial-up Internet Telephony appliances do not attach directly to the Internet and therefore have finite Internet connection time. Internet Telephony requires that the appliances dial-up to the Internet over PSTN before VoIP communication can occur. However, these appliances are normally dormant unless a certain method is devised to generate events that will trigger them to log on to the Internet. These connections normally are only established for as long as they are in use, and are disconnected when they are no longer needed for reason of costs and availability.

Another important aspect of the PSTN infrastructure is the telephone numbering plan. Each PSTN connection has a unique identification or telephone number. A telephone on the PSTN can reach another telephone by simply dialing its unique telephone number.

A dial-up Internet connection in most cases does not have a fixed unique identification. Although each Internet connection does have a unique IP address, dial-up Internet connection is usually assigned with a dynamic IP address that differs each time the dial-up Internet connection is established. For dial-up Internet Telephony to occur, each Internet Telephony user must use a unique identifier and a method that performs translation of this unique identifier to the IP address of its dial-up Internet Telephony appliance.

Various call establishment methods have been adopted for dial-up Internet Telephony based on using existing PSTN and Internet infrastructure. Some of these methods are briefly described below along with their shortcomings.

The "User Look-up from Directory Services" method requires the caller to look up the party to call using some form of Directory Services or User Location Services (ULS). All users need to register their user identification and dynamic IP address with the directory server whenever they log on to Internet to use Internet Telephony. A caller will then be able to look up a registered user from a list of users to obtain the user dynamic IP address for establishing a VoIP call. A disadvantage of this method is the fact that a caller can only reach another party that has already logged on to the Internet and has registered with the directory server.

The "Prearranged Logon Time" method is an extension of the above method. It basically involves prearranging both users to log on to Internet at a predetermined time to establish a VoIP call. A different method of communication needs to take place for the time to be arranged. Generally, this can be done via an e-mail or a normal telephone call. The caller then obtains the dynamic IP address from a directory server using a known identifier such as an e-mail address. One shortcoming of this method is the inability to establish a VoIP call at anytime.

The "Auto Logon following Normal Telephone Call" method removes the need to prearrange time for a VoIP call. A normal telephone call is established when both parties are ready to connect via the Internet and certain buttons or keys are activated. The systems then proceed to identify one another via a communication method while still connected as a normal telephone call. When this is done, the normal telephone call disconnects and the systems automatically log on to Internet. The dynamic IP address is then obtained from a directory server to establish a VoIP call. A disadvantage of this method is the cost of the required normal telephone call prior to establishing a VoIP call.

The "Auto Logon Dedicated Line" method is normally used to bypass the need to incur the cost of a normal telephone call prior to establishing a VoIP call. The system is configured to log on to Internet automatically every time a call is detected on the line and then proceeds to register itself with a directory server. The caller system needs to know the number of the called party and uses this to look up the dynamic IP address from the directory server. A VoIP call is then established. A shortcoming of this method is the fact that a dedicated line needs to be used for VoIP call since all incoming call will be treated as a VoIP call.

Hence, there is a need for a method of establishing a VoIP call for dial-up Internet Telephony appliances that notifies the called party to log on to the Internet with minimal interference to the normal usage of the telephone, transparently acquires the address of the called party using a mechanism to translate a unique identifier to IP address so as to not require prior arrangement to log on to Internet at a prearranged time, does not incur PSTN call charges for establishing PSTN-to-PSTN voice call prior to VoIP call, receives normal PSTN telephone calls as well as VoIP calls, and requires minimum technical and new usage knowledge required for a user to make a VoIP call.

SUMMARY OF THE INVENTION

This new call establishment method for Internet Telephony appliances includes two phases. The first phase is a method of notifying the Internet Telephony appliance of the called party that a VoIP call is being attempted. The second phase is for both systems to automatically log on to the Internet and to proceed through the procedure to establish the VoIP call. The nature of directory server and VoIP protocol is the choice of a particular implementation as this method is independent of any specific directory services or VoIP protocols. The following pseudo-codes and illustrations indicate the steps involved at both the caller's system (local device) and the called party's system (remote device) when making a VoIP call.

DESCRIPTION OF THE PREFERRED EMBODIMENTS

The following description is of the best presently contemplated mode of carrying out the invention. The description is made for the purpose of illustrating the general principles of the invention and is not to be taken in a limiting sense.

For a dial-up Internet telephony appliance, the telephone ring signal is the only indicator that a remote device can use as a notification signal from another party over the PSTN. This new method allows both normal PSTN telephone calls as well as VoIP calls to be used on the same line and equipment. An example VoIP protocol is ITU-T Recommendation H.323 for packet-based multimedia communication systems. The basis of the present invention is to couple the telephone ring signal as an indicator, with some intelligent processing.

Figure 1A:
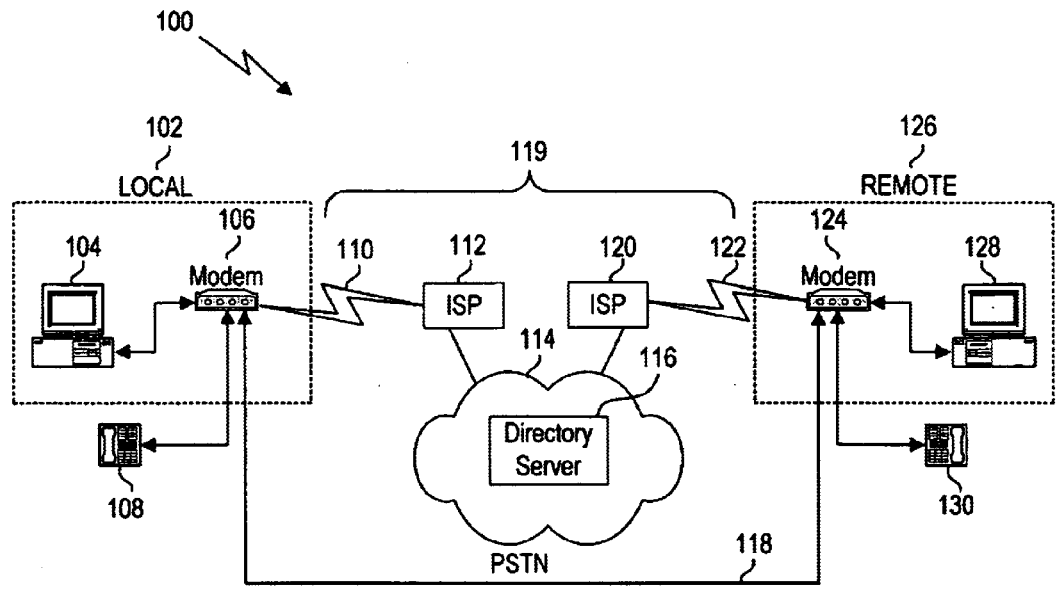
FIG. 1A shows a diagram of an exemplary local device and remote device of an Internet Telephony system in accordance with a preferred embodiment of the present invention.

FIG. 1A shows a diagram of an example local and remote device of an Internet Telephony system in accordance with a preferred embodiment of the present invention. As shown, local device 102 includes a computer 104 connected to modem 106. Modem 106 is connected to a telephone 108.

Computer 104 may be a PC, APPLE or other type of computing device. FIG. 1C shows in detail exemplary components of computer 104. Computer 104 will generally include a processor 140 connected to a memory 142, a computer readable medium device 144 that reads a computer readable medium 146 such as a magnetic disk or CD, an input device 150 such as a keyboard and a display device 152 such as a monitor connected via a bus 148 to local device computer 104. Memory 142 includes local telephony software 143 for providing telephony processing at computer 104. Computer 104 in alternative embodiments of the present invention may include more or fewer components.

Returning to FIG. 1A, modem 106 is a voice modem capable of simultaneous data and full-duplex voice I/O operations and is dual-tone multi-frequency (DTMF) detection capable. Telephone 108 may be of any generally acceptable conventional telephone device that provides for tone dialing.

Similarly, remote device 126 includes a computer 128 connected to modem 124. Modem 124 is connected to a telephone 130.

As discussed above computer 128 may be a PC, APPLE or other type of computing device. FIG. 1D shows in detail exemplary components of computer 124. Computer 128 will generally include a processor 154 connected to a memory 156, a computer readable medium device 158 that reads a computer readable medium 160 such as a magnetic disk or CD, an input device 166 such as a keyboard and a display device 164 such as a monitor connected via a bus 162 to local device computer 128. Memory 156 includes local telephony software 157 for providing telephony processing at computer 128. Computer 128 in alternative embodiments of the present invention may include more or fewer components.

Returning to FIG. 1A, modem 124 is a voice modem capable of simultaneous data and full-duplex voice I/O operations and is dual-tone multi-frequency (DTMF) detection capable. Telephone 130 may be any generally acceptable conventional telephone device that provides for tone dialing.

Local device 102 and remote device 126 may connect to each other via a PSTN 118 and/or VoIP 119 network. As shown modem 106 of local device 102 connects across PSTN 118 to modem 124 of remote device 126. Modem 106 of local device 102 also connects across the Internet based VoIP 119 network to ISP 112 via dial-up connection 110. It will be appreciated that alternative embodiments of the present invention may include connections to the ISP that can be an ISDN connection, a cable modem, or any other appropriate connection. ISP 112 connects directly or indirectly to directory server 116 of the VoIP network 119. Similarly, directory server 116 of VoIP network 119 connects directly or indirectly to ISP 120. Modem 124 of remote device 126 connects to ISP 120 via connection 122. Accordingly, there are two alternative methods of connecting local device 102 and remote device 126.

Figure 1B:
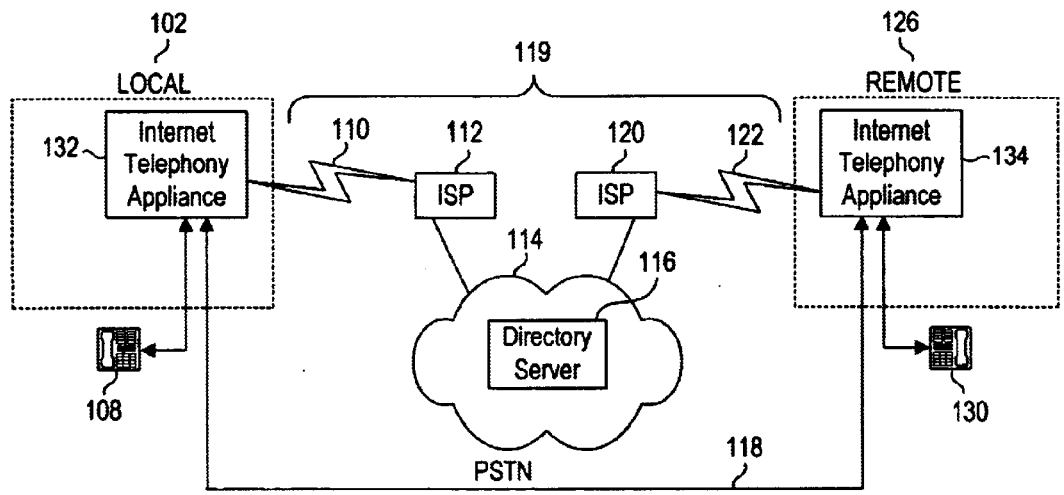
FIG. 1B shows a diagram of another exemplary local and remote device of the Internet Telephony system in accordance with a preferred embodiment of the present invention.
Figure 1C:
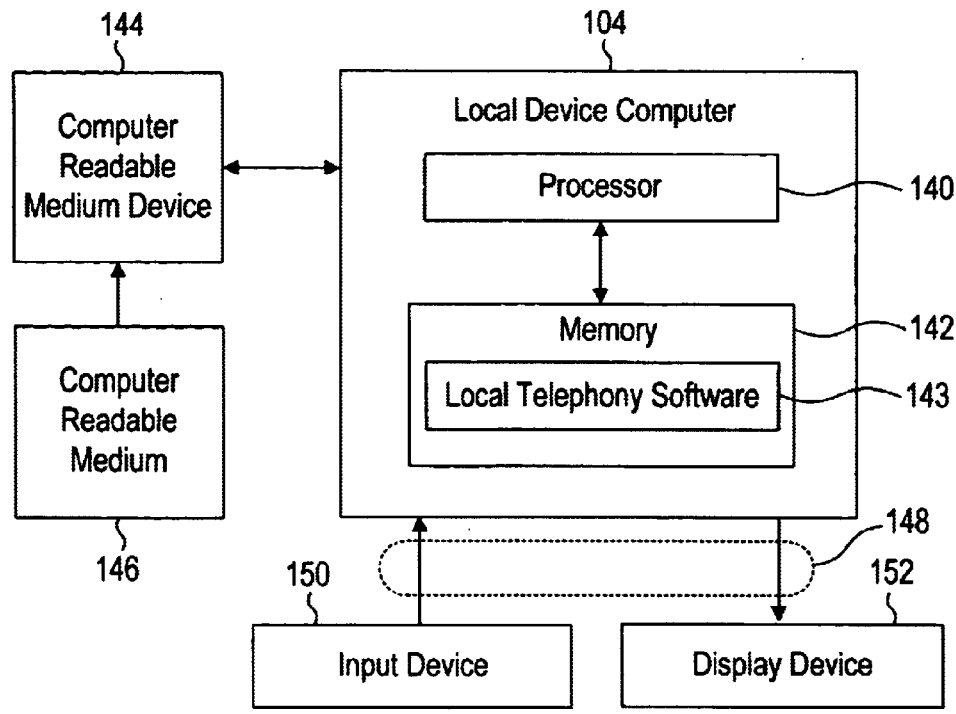
FIG. 1C shows in detail a diagram of the local device computer of FIGS. 1A and 1B.
Figure 1D:
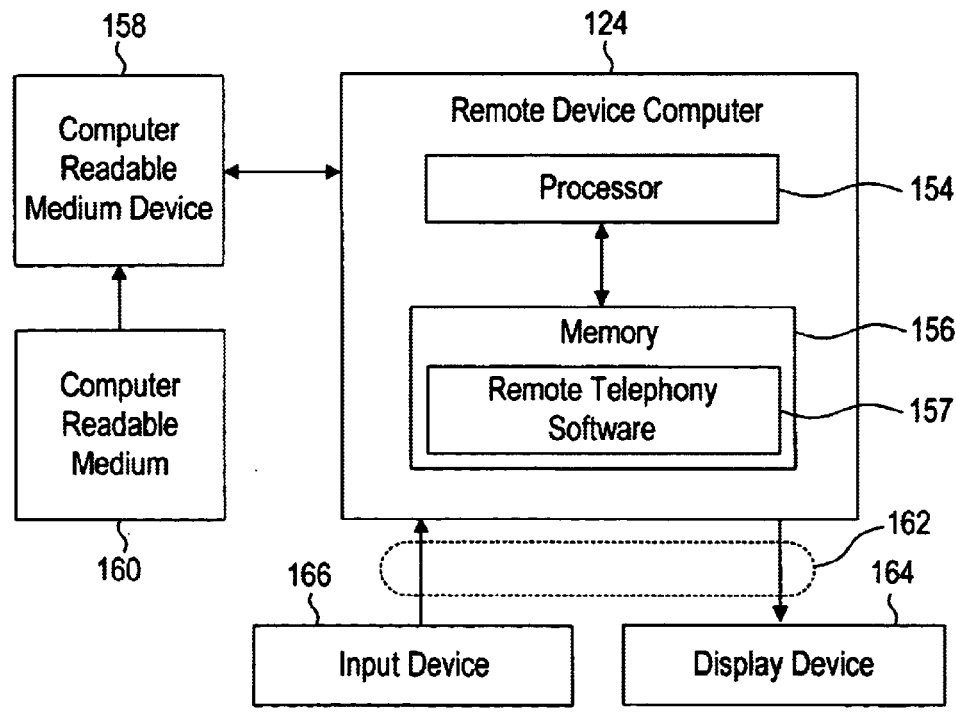
FIG. 1D shows in detail a diagram of the remote device computer of FIGS. 1A and 1B.

FIG. 1B shows another example of a preferred embodiment of the Internet Telephony system of the present invention. As shown, FIG. 1B replaces local device 102, computer 104 and modem 106 of FIG. 1A with an Internet Telephony appliance 132, and replaces remote device 126, computer 128 and modem 124 with an Internet Telephony appliance 134. Internet Telephony appliances 132 and 134 include the functionality of respective modems 106 and 124 and the telephony processing of respective computer 104 and 128. Connections between Internet Telephony appliances are consistent with that of FIG. 1A. Hence, Internet Telephony appliance 132 is connected to telephone 108 and Internet Telephony appliance 134 is connected to telephone 130. The PSTN 118 and VoIP network 119 connections are the same as described above with regard to FIG. 1A.

In FIG. 1A and FIG. 1B a caller (such as a human being) dials, at local device 102, the remote party at remote device 126 over the PSTN network 118. Upon hearing the ring-back tone that indicates the remote party telephone 130 is ringing, the caller must drop the PSTN connection within a certain amount of time. Preferably that amount of time is 10 seconds, however, an alternative embodiment may chose a different amount of time that corresponds to the particularities of that embodiment. The actual action of dropping the line could be performed by the caller hanging up the handset or by the local Internet appliance in response to the caller's pressing a button on the telephone 108 or the device 102.

The caller triggers the event to drop the PSTN connection because of the variety of telephone networks and equipment around the world. Each of these generates different tones for dial tone, ring-back tone, busy tone, and others. Human assistance is preferable in this case to determine the actual tone heard. However, alternative embodiments of the present invention may include local device 102 that is capable of intelligently distinguishing between different tones which enables local device 102 to drop the PSTN connection. A special dialing sequence might also be required to assist the system in determining whether a call being made is a normal telephone call or a VoIP call.

Figure 2:
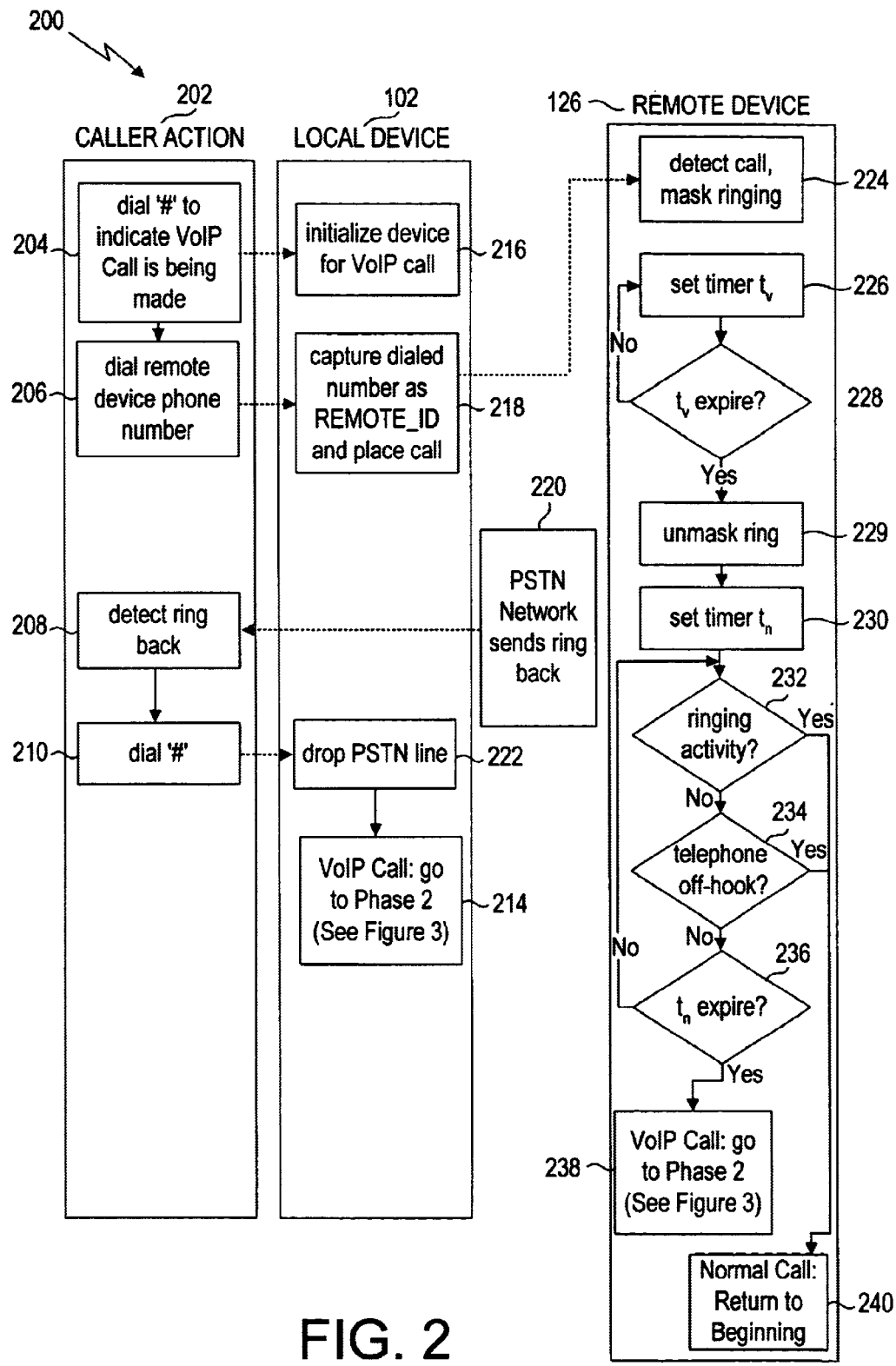
FIG. 2 is a flowchart of Phase I of the dial-up Internet Telephony method provided by the systems shown in FIG. 1A and FIG. 1B.

FIG. 2 is a flowchart of Phase I of an embodiment of a dial-up Internet Telephony method provided by the systems shown in FIG. 1A and FIG. 1B. More particularly, FIG. 2 shows a caller action 202 at local device 102 for establishing a VoIP connection with remote device 126.

The remote Internet Telephony appliance determines the nature of a call, whether it is a normal voice call or a VoIP call, by analyzing the duration of the telephone ring signal. For example, a telephone ring signal for 15 seconds may indicate a normal PSTN call, while a telephone ring signal for 6 seconds may indicate a VoIP call. This example is provided only for illustrative purposes, thus, alternative durations of ring signals may be used to designate the different types of incoming calls.

In order to begin the call, in step 204, the caller presses a key such as '#' to indicate that a VoIP call is being made. When the key is pressed, in step 216, local device 102 is initialized for the VoIP call. For instance, modem 106 is initialized in FIG. 1A, and Internet Telephony appliance 132 is initialized in FIG. 1B. In step 206, the caller dials the phone number of remote device 126 and in step 218 local device 102 captures the dialed number as "REMOTE_ID." Local device 102 then places the call over PSTN network 118. In step 224, remote device 126 detects the call and immediately masks the ringing. The ringing is masked so that the individual receiving the call at remote device 126 is not tempted to pick up the telephone and thereby incur a telephone call charge.

When the first ring activity is detected, in step 226, remote device 126 sets timer $t_v$. Timer $t_v$ is set for a time-out period to allow the PSTN Network time in step 220 to send local device 102 a ring back tone and to allow the caller to detect and respond to the ring back tone in step 208. The caller, in response to detecting a ring back, in step 210, presses a # key (or hangs up the handset) hat in step 222 triggers local device 102 to drop the PSTN line. Timer $t_v$ should be set to a value that takes into consideration various factors including delay in the PSTN network, human response time and other factors, and also allow significant margin for error. For example, $t_v$ is preferably set to a time of approximately 10 seconds. However, alternative embodiments depending upon the various factors and particular telecommunications protocol may set $t_v$ to a different time period.

There is also a need to minimize interference to the normal usage of the telephone during this period. For example, it is foreseeable that the called party will answer a call if the telephone is ringing. Therefore, as discussed above there is a need to mask off the telephone ringing during the period of $t_v$. This is preferably achieved by including circuitry in the remote Internet Telephony appliance to suppress the ring signal. An alternative method for appliances that can perform ring signal suppression is a concurrent audio or visual alert signal could be generated for the period $t_v$ to remind the called party to ignore the ring signal for that short initial period. The telephone ringing is unmasked in step 229 upon expiration of the timer $t_v$.

After the $t_v$ period has expired, the remote device continues to monitor PSTN connection 118 for a ring signal for time period $t_n$ to ascertain whether the caller has dropped the connection. The value of $t_n$ should be set to a value that is longer than the total value of the on and off periods of telephone ring cadence. For example, $t_n$ is preferably set to a time of approximately 10 seconds. However, alternative embodiments depending upon the various factors and particular telecommunications protocol may set $t_n$ to a different time period.

Any ring activity detected during this period will indicate that this is not a VoIP call (since a VoIP call would have dropped the PSTN line by this time). Hence in step 230, remote device 126 sets timer $t_n$. In step 232, the remote device determines if there is ringing activity. If there is ringing activity then in step 240 it is concluded that the call is a normal "PSTN" call and processing returns to the beginning of this telephony method. If ring activity does not occur then in step 234 remote device 126 determines if the telephone is off the hook. If the telephone is off the hook it is concluded in step 240 that an individual at remote device 126 has picked-up the telephone handset for a normal "PSTN" call and therefore processing returns to the beginning of this telephony method. If the telephone is not off-hook then in step 236 remote device 126 determines if $t_n$ has expired. If $t_n$ has not expired control then loops back to determine if there is ringing activity, if the telephone is off-hook or if the timer has expired. If $t_n$ has expired then the remote device will determine that the incoming call is a VoIP call and therefore the telephony protocol will continue to Phase 2 as shown in FIG. 3. In step 214, after local device 102 drops the PSTN line, control similarly proceeds to the VoIP call in Phase 2 as shown in FIG. 3.

Figure 3A:
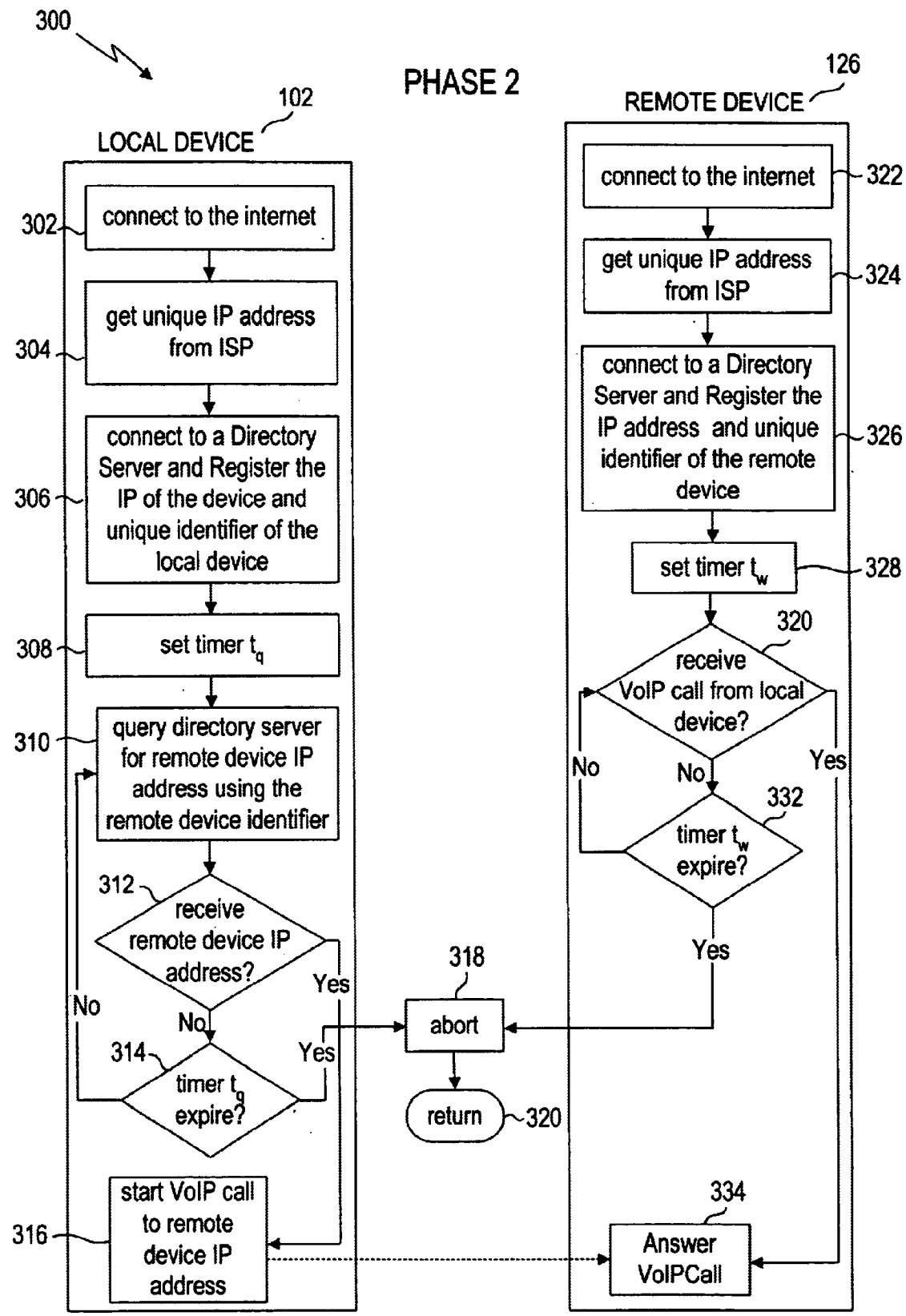
FIG. 3A is a flowchart of Phase II of the dial-up Internet Telephony method provided by the systems shown in FIGS. 1A and 1B.

Upon successful completion of the call notification process in Phase I, both remote device 126 and local device 102 will proceed to log on to the Internet. FIG. 3A shows a flowchart of Phase II of the dial-up Internet Telephony method provided by the systems shown in FIGS. 1A and 1B. As shown, in step 302 local device 102 connects to the Internet. In step 304, local device 102 gets a unique IP address that is dynamically assigned by ISP 112. In step 306, local device 102 via ISP 112 connects to directory server 116 and registers the dynamically assigned IP address and a unique identifier of the local device. The unique identifier is preferably the phone number of the local device or a number derived from the phone number. The remote device telephone number is subsequently used as the key for a query to the directory server because it is unique. In addition, both devices know the remote device telephone number because local device 102 captures the number as it is dialed, and remote device 126 is set up with this number. However, alternative embodiments may choose a different scheme for assigning unique identifiers.

While local device 102 is logging onto the Internet as described above remote device 126 in step 322 is similarly connecting to the Internet. Remote device 126 in step 324 gets a unique IP address from ISP 120. In step 326 remote device 126 connects to directory server 116 and registers the IP address and a unique device identifier. As discussed above, this unique device identifier is preferably the remote telephone number.

Figure 3B:
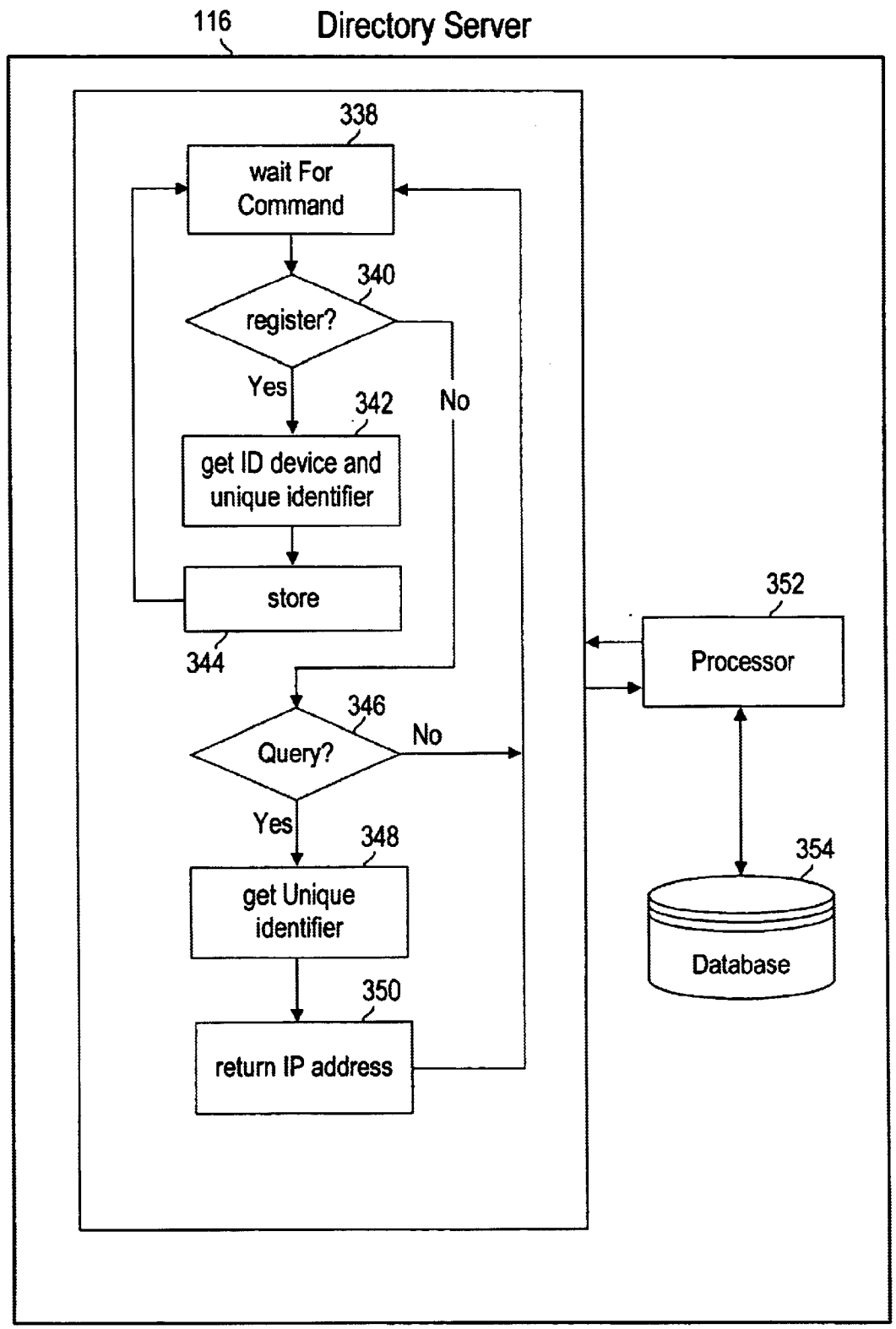
FIG. 3B is a flowchart of the steps performed by the directory server during Phase II of the Internet Telephony method shown in FIG. 3A.

FIG. 3B shows a flowchart of the steps performed by a processor 352 of directory server 116 during Phase II of the Internet Telephony method shown in FIG. 3A. As shown in step 338, the initial state of processor 352 of directory server 116 is to wait for a command. If in step 340, directory server receives a "register" command, such as a request to register an IP address and a unique identifier, then in step 342 processor 352 gets the IP address and a unique identifier from the request. In step 344, processor 352 stores the IP address and the unique identifier in a database 354. The address and identifier preferably are stored in database 354 in a conventional database format that allows for ease of data storage and retrieval. Once the data is stored, processor 352 of directory server 116 returns to the state in step 338 of waiting for the next command.

If the command in step 340 is not "register" then in step 346 processor 352 determines if the command is a "query." If the command is a query, then in step 348, processor 352 gets a unique identifier from the query command. Processor 352 then searches database 354 to locate the corresponding dynamically assigned IP address. Once found, in step 350 processor 352 of directory server 116 returns the IP address to the source of the query. Once the data is retrieved and returned processor 352 of directory server 116 returns to the state in step 338 of waiting for the next command.

Returning to FIG. 3A, after local device 102 is registered, in step 308, local device 102 sets timer $t_q$. The purpose of timer $t_q$ is to establish a time-out period for the local device's attempt to identify and retrieve the dynamically assigned IP address of remote device 126. In step 310, local device 102 begins to query directory server 116 for the remote device IP address using the remote device identifier captured from the dialed number in Phase I. In step 312, local device 102 determines whether it has received the dynamically assigned IP address of remote device 126. If the address has not been received then in step 314 timer $t_q$ is checked to determine whether the timer has expired. If $t_q$ expires than the query of step 310 aborts in step 318 and returns in step 320 to the beginning of the process. If the timer has not expired then the query for the remote device's IP address continues. If in step 312 the IP address of the remote device 126 is found then in step 316 local device 102 proceeds to initiate a VoIP call to the remote IP address of the remote device 126.

The factors that should be considered in determining when to set and for what duration to set timer $t_q$ include the time taken for remote device 126 to log on to the Internet, the time taken for remote device 126 to connect and register with directory server 116 and the timer periods $t_v$ and $t_n$. For example, $t_q$ is preferably set to a time of approximately 3 minutes. However, alternative embodiments depending upon the various factors and particular telecommunications protocol may set $t_q$ to a different time period.

While local device 102 attempts to send a VoIP call, remote device 126 after successfully connecting and registering with directory server 116 in steps 322–326, monitors for incoming calls. Hence, in step 328 remote device 126 sets time $t_w$ to establish a time-out period for monitoring for an incoming VoIP call. For example, $t_w$ is preferably set to a time of approximately 3 minutes. However, alternative embodiments depending upon the various factors and particular telecommunications protocol may set $t_w$ to a different time period. If a VoIP call is not received during the time-out period set in timer $t_w$, the process is aborted. The time-out period could occur due to a number of reasons. For example, local device 102 may be unable to log on to the Internet. Further, local device 102 may be unable to retrieve the remote device IP. Still further, an invalid remote identifier may have been used by local device 102 for the query operation. In addition, it is possible that an accidental call satisfied the call notification process of Phase I, but that the call originated from an incompatible Internet Telephony device.

In step 330, remote device 126 continues to monitor whether it has received a VoIP call from local device 102. If not then remote device 126 determines if timer $t_w$ expired. If timer $t_w$ has expired then the process in step 318 aborts and returns in step 320 to the beginning of this process. If timer $t_w$ has not expired then remote device again monitors whether it has received a VoIP call from local device 102. If remote device 126 detects the incoming VoIP call from local device 102 in step 330 then in step 334 remote device 126 is alerted and then proceeds to answer the VoIP call.

In summary, call notification involves two distinct operations at the local and remote device. Each device can either be a local or remote device depending on the event that triggers it. Table 1 shows a procedure to determine whether a device is local or remote. Table 2 and 3 show a procedure in both local and remote devices, respectively. Tables 4 and 5 show a procedure for Phase II of establishing a VoIP call between local and remote devices.

TABLE 1

Pseudo-code for Phase I of Call Notification Process

```
phaseI_start:
    ;wait for telephone to go off-hook or ring
    if telephone off-hook then
        goto phaseI_local
    if telephone ring then
        goto phaseI_remote
    goto phaseI_start
```

TABLE 2

Pseudo-code for Phase I of Local Device Process

```
phaseI_local:
    ; check for initial '#' to indicate a VoIP call being made
    if telephone on-hook then
        goto phaseI_start
    get DTMF_TONE
    if DTMF_TONE <> '#' then
        goto phaseI_start
    ; capture all dialed number until second '#' is encountered
    REMOTE_ID = NULL
    repeat
        ; restart if telephone goes on-hook
        if telephone on-hook then
            goto phaseI_start
        get DTMF_TONE
        if DTMF_TONE <> '#' then
            REMOTE_ID = REMOTE_ID + DTMF_TONE
    until DTMF_TONE = = '#'
    ; VoIP call is confirm, proceed to next phase
    drop PSTN call
    goto phaseII_local
NOTE:
    REMOTE_ID is the remote party telephone number which will
    be used as unique ID for directory server lookup in Phase II
```

TABLE 3

Pseudo-code for Phase I of Remote Device Process

```
phaseI_remote:
    ; mask off telephone ring for initial period of tv
    setup timer t_v
    mask telephone ring
    wait for t_v expire
    unmask telephone ring
    ; check if this is a normal voice call
    setup timer t_n
    repeat
        if telephone ring then
            goto normal_call
        if telephone off-hook then
            goto phaseI_start
    until t_n expire
    ; VoIP attempt is detected, proceed to next phase
    goto phaseII_remote
    ; normal voice call detected, wait until no more ring or call
    ; is answered by remote party
```

TABLE 3-continued

Pseudo-code for Phase I of Remote Device Process

```
    normal_call:
        setup timer t_r
        repeat
            if telephone ring then
                setup timer t_r
            if telephone off-hook then
                goto phaseI_start
        until t_r expired
        goto phaseI_start
NOTE:
    t_v  :  time-out period for caller to confirm a VoIP call
    t_n  :  time-out period for detection of normal call
    t_r  :  time-out period for detection of ring completion
```

TABLE 4

Pseudo-code for Phase II of Local Device Process

```
phaseII_local:
;log on to Internet and get local IP address
log on to Internet
LOCAL_IP = IP address assigned by ISP
LOCAL_ID = telephone number of local device PSTN line
;register locaL device with directory server
connect to directory server
register_IP (LOCAL_ID, LOCAL_IP) with directory server
;look up IP address of remote device using REMOTE_ID
setup timer t_q
repeat
    REMOTE_IP = query_IP (REMOTE_ID) from directory server
    ;if IP address of remote device is received successfully
    ;initiate VoIP call with REMOTE_IP
    if query_IP successful then
        goto VoIP_call (REMOTE_IP)
until t_q expire
;time-out and call is aborted
goto phaseI_start
NOTE:
    t_q is the time-out period for attempts to query for remote IP address
    REMOTE_ID is the remote party telephone number which was
    captured in Phase I
    REMOTE_IP is the remote IP address that is returned by a
    successful query to the directory server
    VoIP_call is a generic procedure to initiate a protocol specific
    VoIP call with the IP address specified
```

TABLE 5

Pseudo-code for Phase II of Remote Device Process

```
phase II_remote:
    ; log on to Internet and get remote IP address
    log on to Internet
    REMOTE_IP = IP address assigned by ISP
    REMOTE_ID = telephone number of local device PSTN line
    ; register remote device with directory server
    connect to directory server
    register_IP (REMOTE_ID, REMOTE_IP) with directory server
    ; wait for call from caller device for a period of t_w
    setup timer t_w
    repeat
        if VoIP_callalert is true then
            gotoVoIP_answer
    until t_w expire
    ; time-out and call is aborted
    goto phaseI_start
NOTE:
    t_w is the time-out period for waiting for the caller device to attempt
    a VoIP call
    VoIP_callalert is a generic procedure that return the status of
    whether a VoIP call alert signal is being received
```

TABLE 5-continued

Pseudo-code for Phase II of Remote Device Process

VoIP_answer is a generic procedure to answer a VoIP call

It can therefore be appreciated that a new and novel Internet Telephony connection method has been described. It will be appreciated by those skilled in the art that, given the teaching herein, numerous alternatives and equivalents will be seen to exist which incorporate the invention disclosed hereby. As a result, the invention is not to be limited by the foregoing exemplary embodiments, but only by the following claims and equivalents thereof.

What is claimed is:

1. A method of performing a voice-over-IP call over the Internet from a local device to a remote device, the method comprising:
   receiving an indication to perform a voice-over-IP call;
   placing a call over a telephone network to establish a first connection with a remote device;
   receiving a ring back tone from the telephone network;
   dropping the first connection with the remote device within a predetermined time after receiving the ring back tone; and
   establishing a second connection to the remote device over the Internet, wherein the second connection is the voice-over-IP call.

2. The method of claim 1, wherein the indication to perform a voice-over-IP call is caused by a caller's selection of a key on a local device.

3. The method of claim 1, wherein placing a call over a telephone network comprises storing a remote telephone number associated with the remote device.

4. The method of claim 1, wherein dropping the first connection with the remote device comprises:
   receiving an indication from a caller to drop the first connection; and
   triggering the telephone network to drop the first connection.

5. The method of claim 4, wherein the indication from the caller is caused by the caller's selection of a key on a local device.

6. The method of claim 1, wherein establishing the second connection comprises:
   connecting to the Internet;
   querying a directory server for an IP address of the remote device;
   receiving an IP address of the remote device; and
   initiating the voice-over-IP call to the remote device at the IP address of the remote device.

7. The method of claim 6, wherein querying of the directory server occurs until expiration of a time $t_q$.

8. The method of claim 6, further comprising:
   acquiring an IP address of a local device; and
   connecting to a directory server to register the IP address of the local device.

9. A method of performing a voice-over-IP call over the Internet from a local device to a remote device, the method comprising:
   detecting a telephone call from a local device;
   determining that the telephone call is a telephone network call; and
   establishing a voice-over-IP call after the local device drops the telephone network call and before the local device incurs a telephone network charge.

10. The method of claim 9, wherein detecting a telephone call comprises masking a ringing sound of a remote telephone associated with a remote device.

11. The method of claim 9, wherein determining that the telephone call is a telephone network call comprises determining that the telephone call is a telephone network call when there is ringing activity in a remote telephone associated with a remote device within a time $t_n$.

12. The method of claim 9, wherein establishing a voice-over-IP call comprises:
   connecting to the Internet;
   acquiring an IP address of a remote device;
   connecting to a directory server to register the IP address and a unique identifier of the remote device; and
   receiving the voice-over-IP call from the local device.

13. The method of claim 12, wherein receiving the voice-over-IP call occurs within a time $t_w$.

14. An Internet Telephony system for performing a voice-over-IP call over the Internet from a local device to a remote device, wherein the local device comprises:
   means for receiving an indication to perform a voice-over-IP call;
   means for placing a call over a telephone network to establish a first connection with a remote device;
   means for receiving a ring back tone from the telephone network;
   means for dropping the first connection with the remote device within a predetermined time after receiving the ring back tone; and
   means for establishing a second connection to the remote device over the Internet, wherein the second connection is the voice-over-IP call.

15. An Internet Telephony system for performing a voice-over-IP call over the Internet from a local device to a remote device, wherein the remote device comprises:
   means for detecting a telephone call from a local device;
   means for determining that the telephone call is a telephone network call; and
   means for establishing a voice-over-IP call after the local device drops the telephone network call and before the local device incurs a telephone network charge.

16. A computer readable storage medium storing computer instructions for:
   receiving an indication to perform a voice-over-IP call;
   placing a call over a telephone network to establish a first connection with a remote device;
   receiving a ring back tone from the telephone network;
   dropping the first connection with the remote device within a predetermined time after receiving the ring back tone; and
   establishing a second connection to the remote device over the Internet, wherein the second connection is the voice-over-IP call.

17. A computer readable storage medium storing computer instructions for:
   detecting a telephone call from a local device;
   determining that the telephone call is a telephone network call; and
   establishing a voice-over-IP call after the local device drops the telephone network call and before the local device incurs a telephone network charge.

18. A computer data signal embodied in a carrier wave and representing sequences of instructions which, when executed by a processor, cause the processor to execute a process for performing a voice-over-IP call over the Internet from a local device to a remote device, the process comprising:
   receiving an indication to perform a voice-over-IP call;
   placing a call over a telephone network to establish a first connection with a remote device;
   receiving a ring back tone from the telephone network;
   dropping the first connection with the remote device within a predetermined time after receiving the ring back tone; and
   establishing a second connection to the remote device over the Internet, wherein the second connection is the voice-over-IP call.

19. A computer data signal embodied in a carrier wave and representing sequences of instructions which, when executed by a processor, cause the processor to execute a process for performing a voice-over-IP call over the Internet from a local device to a remote device, the process comprising:
   detecting a telephone call from a local device;
   determining that the telephone call is a telephone network call; and
   establishing a voice-over-IP call after the local device drops the telephone network call and before the local device incurs a telephone network charge.

20. The method of claim 9, wherein determining that the telephone call is a telephone network call comprises determining that the call is a PSTN call when a remote telephone associated with a remote device goes off-hook within a time $t_n$.

21. A computer system for performing voice-over-IP call over the Internet, the computer system comprising:
   a computer; and
   a computer program executable on the computer, wherein the computer program comprises computer instructions for:
      receiving an indication to perform a voice-over-IP call;
      placing a call over a telephone network to establish a first connection with a remote device;
      receiving a ring back tone from the telephone network;
      dropping the first connection with the remote device within a predetermined time after receiving the ring back tone; and
      establishing a second connection to the remote device over the Internet, wherein the second connection is the voice-over-IP call.

22. The computer system of claim 21, wherein dropping the first connection with the remote device comprises:
   receiving an indication from a caller to drop the first connection; and
   triggering the telephone network to drop the first connection.

23. The computer system of claim 21, wherein establishing a second connection to the remote device comprises:
   connecting to the Internet;
   querying a directory server for an IP address of the remote device;
   receiving an IP address of the remote device; and
   initiating the voice-over-IP call to the remote device at the IP address of the remote device.

24. The computer system of claim 23, wherein establishing a second connection to the remote device further comprises:

acquiring an IP address of the computer; and connecting to a directory server to register the IP address of the computer.

25. A computer system for performing voice-over-IP call over the Internet, the computer system comprising:

a computer; and a computer program executable on the computer, wherein the computer program comprises computer instructions for:

detecting a telephone call from a remote device;

determining that the telephone call is a telephone network call; and establishing a voice-over-IP call after the remote device drops the telephone network call and before the remote device incurs a telephone network charge.

26. The computer system of claim 25, wherein establishing a voice-over-IP call comprises:

connecting to the Internet;

acquiring an IP address of the computer;

connecting to a directory server to register the IP address and a unique identifier of the computer; and receiving the voice-over-IP call from the remote device.

* * * * *